Nov. 11, 1958 W. S. HIMPELE 2,859,540
ELECTRICAL EDUCATIONAL DEVICE
Filed May 20, 1955 2 Sheets-Sheet 1

INVENTOR.
WALTER S. HIMPELE
BY
F. J. Pisarra
ATTORNEY

Nov. 11, 1958  W. S. HIMPELE  2,859,540
ELECTRICAL EDUCATIONAL DEVICE
Filed May 20, 1955  2 Sheets-Sheet 2
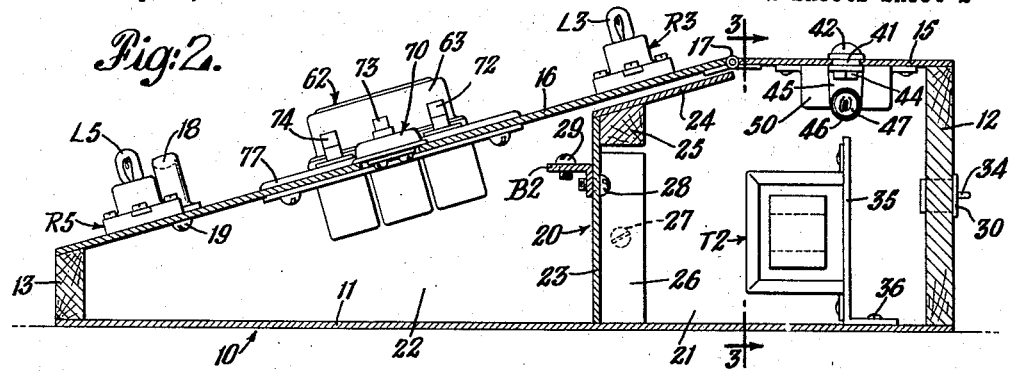
Fig:2.
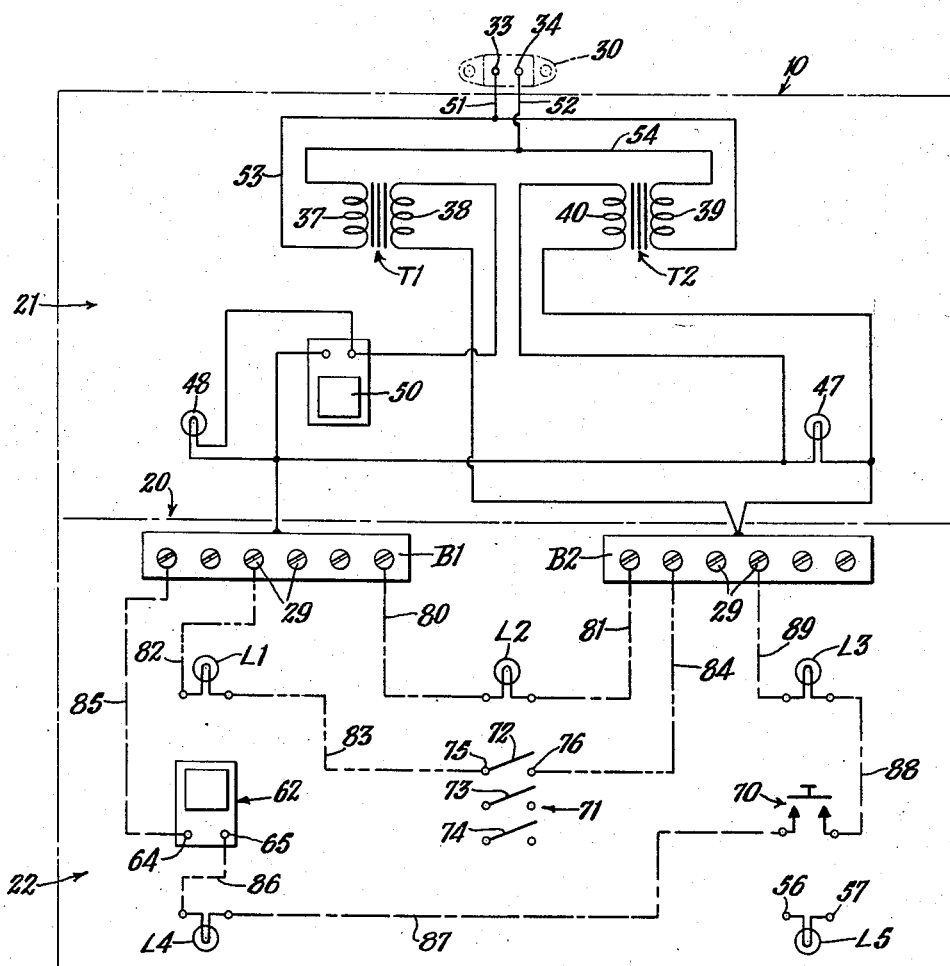
Fig:5.
INVENTOR.
WALTER S. HIMPELE
BY
F. J. Pisarra
ATTORNEY

United States Patent Office

2,859,540
Patented Nov. 11, 1958

2,859,540

ELECTRICAL EDUCATIONAL DEVICE

Walter S. Himpele, Clark Township, N. J.

Application May 20, 1955, Serial No. 509,816

6 Claims. (Cl. 35—19)

This invention relates to an electrical educational device, and, on one of its more specific aspects, to a device that is adapted to be advantageously used in teaching and demonstrating certain fundamentals of electric circuits to persons who are not versed in such fundamentals.

The device of this invention constitutes a practical and interesting means for imparting to individuals, particularly children, basic knowledge and training in the art of forming or completing electric circuits and utilizing electrical instrumentalities in such circuits. The many and varied advances in the field of electricity, in comparatively recent years, and the increased number of electrical appliances now used in the home have created corresponding interest and eagerness on the part of children for knowledge of electricity and its applications to everyday use. The present invention is intended to, and does in fact, serve as a simple and safe means for conveying basic information concerning electric circuits to a child. Also, it permits him to utilize information thus obtained in planning and performing a variety of experiments involving circuits of varying complexity. The circuits may range from a simple series circuit employing a single electrical unit, such as a lamp, to one employing a plurality of electrical units, such as several lamps, a buzzer and several switches.

One of the outstanding features of the invention is that the parts are so constructed and arranged as to afford complete safety to the user. To this end, the device includes transformer means for reducing 110 volt or 220 volt A. C. usually supplied to the home, to 6 volt A. C. The transformer means is housed in a separate compartment, constituting a part of the device, and is sealed therein so as to prevent access thereto by the child. Only the low voltage current supplied by the transformer is available to the child.

An important feature of the invention resides in the provision of signaling means for visually and/or audibly indicating the condition of circuits that are completed by the use of the device. The signaling means preferably includes a first visual signal that indicates when the device is in proper condition and a second visual signal that is operative only when the device is in improper condition. The device may additionally include an audible signal, such as a buzzer, that indicates improper conditions only. The signaling means are also located in the compartment with the transformer means to prevent tampering.

Another important feature of the invention is that the device includes a hinged cover which also serves as a panel board for a plurality of electrical units that are used in completing various circuits. The cover additionally serves as a wall of a compartment which is adapted to contain wire conductors employed in completing the circuits. The electrical units mounted on the cover are accessible either from the inner side or the outer side of the cover to facilitate making desired connections.

The foregoing features as well as other features of the invention will be apparent to persons skilled in the art from the detailed description that follows and the accompanying drawings.

The invention has for a primary object the provision of an electrical education device having improved features of design and construction.

Another object of the invention is to provide an electrical educational device for teaching and demonstrating the formation or completion of electric circuits in an interesting manner.

A further object of the invention is to provide a device of the character indicated having its parts so constructed and arranged as to afford complete safety to persons using the same.

A still further object of the invention is to provide an electrical educational device that is attractive in design, that is lightweight and portable, that is sturdy in construction and that is reasonable in manufacturing cost.

The enumerated objects, as well as other objects, will be evident to persons skilled in the art from the following detailed description taken in conjunction with the annexed drawings which respectively describe and illustrate a device embodying the invention.

In the drawings:

Fig. 2 is a view in cross-section taken along line 2—2 of Fig. 1;

Fig. 5 is a view corresponding to Fig. 1 and illustrating diagrammatically the interconnected electrical relationship of certain parts.

Figure 1:
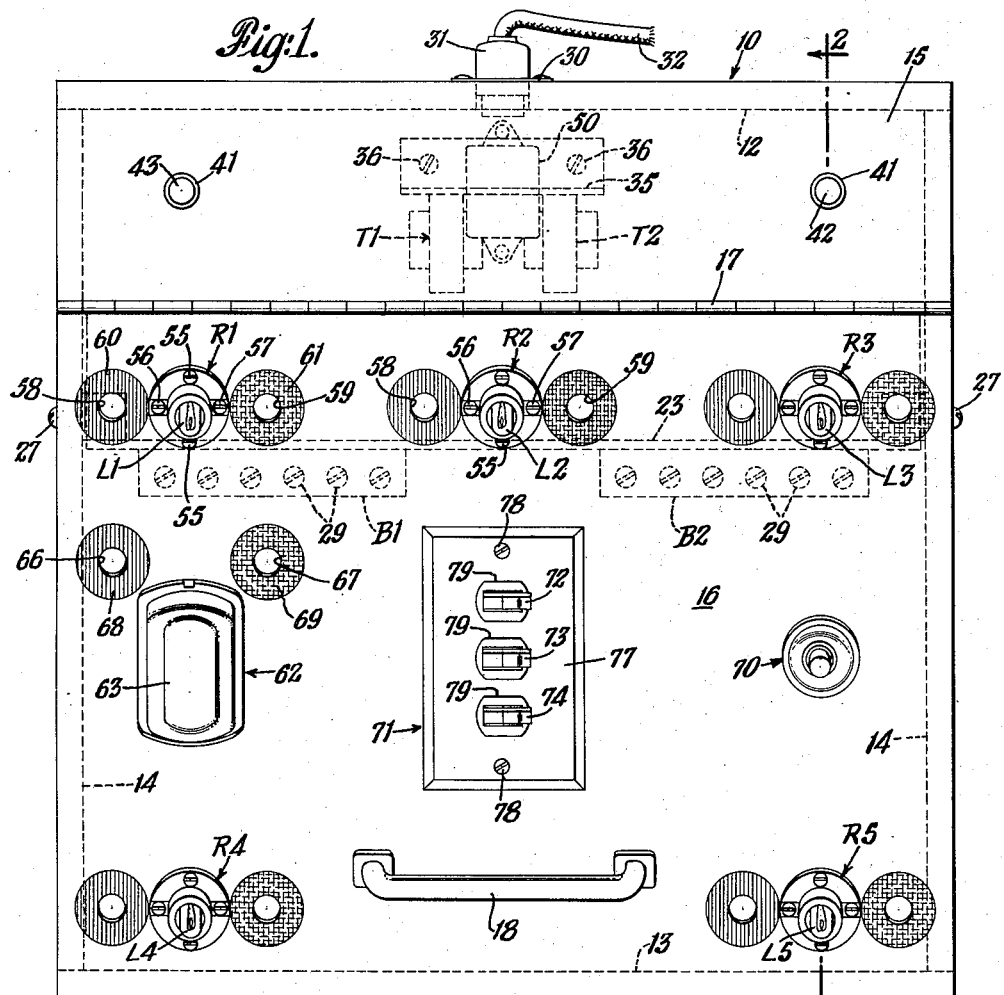
Fig. 1 is a top plan view of an electrical educational device constructed in accordance with the invention.

Referring now to the drawings, wherein like reference numerals denote corresponding parts throughout the several views, the device comprises a casing 10 that may be made of any suitable electrical insulating material, such as wood paneling, plywood, composition board, a synthetic resinous composition, or combinations thereof. The casing includes a bottom wall 11, vertical rear and front walls 12 and 13, respectively, and vertical side walls 14. The housing has a top wall consisting of a first part 15, which is rigidly secured to the upper ends of the rear and side walls, and a second part or cover 16, which is pivotally connected to the forward portion of part 15 by a piano hinge 17. Part 16 serves not only as a cover but also as a panel board for electrical units that will be described further along. As is best shown in Fig. 2, top wall part 15 is parallel to bottom wall 11 while cover 16, when in closed position, is inclined thereto. A handle 18, for swinging the cover to open or closed position about its hinge 17, is secured to the cover by screws 19.

Figure 3:
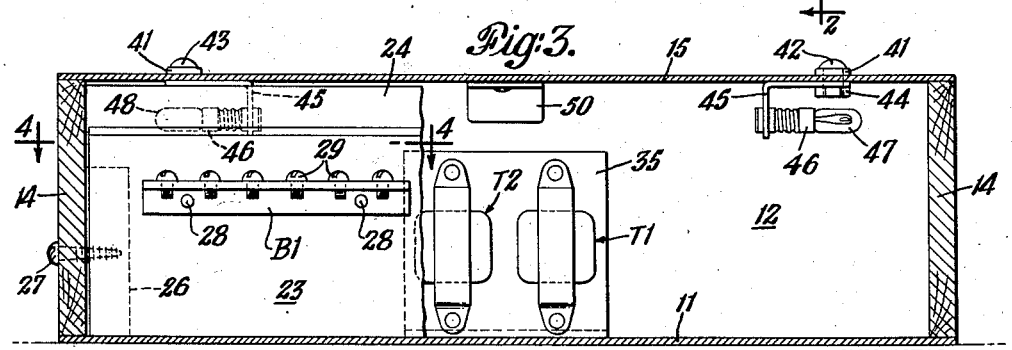
Fig. 3 is a view in cross-section taken along line 3—3 of Fig. 2.
Figure 4:
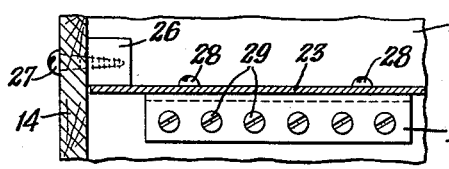
Fig. 4 is a fragmentary view taken along line 4—4 of Fig. 3.

A partition 20 is positioned in the casing and divides its interior into a first compartment 21 and a second compartment 22. The partition comprises an upstanding section 23 and an inclined section 24 that are glued to and maintained in the illustrated relative position by a block 25. A block 26 is attached to each end of partition section 23 preferably by gluing. The partition is secured to the casing by screws 27 which extend through the side walls of the casing and engage blocks 26 (Figs. 3 and 4). The partition may be detached from the remainder of the casing by removing screws 27 thereby permitting access to compartment 21.

A pair of angle-type electrically conductive members, or bus bars, B1 and B2 is mounted on partition section 23 by screws 28. As is illustrated in Fig. 2, the bus bars are disposed in compartment 22. Each bus bar has a plurality of screw type contact posts 29.

A male electric coupling unit 30, mounted in the casing rear wall, is detachably connected to a female coupling member 31 which is adapted to be connected by a two-wire cable 32 to a conventional 110 volt or 220 volt house current outlet. Coupling unit 30 includes a pair of terminal posts 33 and 34 (Fig. 5). An L-bracket 35 is positioned in compartment 21 and is affixed to bottom wall 11 of the casing by screws 36. This bracket carries a transformer means consisting of a pair of transformers T1 and T2 for reducing the current supplied to the device from 110 volts or 220 volts to a safe value for handling, such as 6 volts. Transformer T1 has a primary coil 37 and a secondary coil 38. Similarly, transformer T2 has a primary coil 39 and a secondary coil 40 (Fig. 5).

Extending through casing top part 15 is a pair of externally threaded tubular fittings 41. These fittings have corresponding translucent windows 42 and 43 that are preferably of contrasting colors. It is recommended that window 42 be green in color and window 43 red. Each fitting 41 is provided with a nut 44 and carries a bracket 45 which supports a miniature lamp socket 46. The lamp socket beneath window 42 carries a lamp 47 and the lamp socket beneath window 43 carries a lamp 48 (Fig. 3). Lamp 47 serves as a signal to indicate proper electrical conditions in the device. Lamp 48 also serves as a signal but is operative only to indicate incorrect connections in the device. The device is equipped with an audible signal 50, preferably a buzzer for indicating improper electrical conditions in the device.

Referring now to Fig. 5, it will be noted that terminal posts 33 and 34 are electrically connected to primary coils 37 and 39 of the transformers by conductor wires 51, 52, 53 and 54. The illustrated circuit diagram includes a series of conductor wires that connect secondary coils 38 and 40 to bus bars B1 and B2. Interposed in and forming part of the circuit are earlier described signal lamps 47 and 48 and buzzer 50. The parts are so arranged and electrically interconnected that, when the circuit is properly completed by connecting the bus bars to one or more electrical units, to be described, and energized, lamp 47 will be energized and light rays emitted therefrom will visually indicate through the medium of signal window 42 that the circuit is in proper condition. At such times, lamp 48 and buzzer 50 will be deenergized and therefore out of active service. In the event the circuit is improperly completed, however, lamp 47 will be automatically deenergized and lamp 48 and buzzer 50 will be energized simultaneously thereby indicating both visually and audibly that circuit conditions are incorrect. The user should thereupon immediately disconnect coupling unit 31 from coupling unit 30, and take necessary steps to locate the cause and rectify the condition.

A plurality of lamp receptacles, R1 through R5, is mounted on casing cover 16, the individual receptacles preferably being in the illustrated locations. Each receptacle is attached to the cover by bolts 55 and is provided with a pair of screw type contact posts 56 and 57. Adjacent each receptacle are openings 58 and 59 which extend through cover 16. As shown in Fig. 1, these openings are located to opposite sides of the corresponding receptacle. Openings 58 and 59 are encircled by contrasting color bands 60 and 61 respectively, for purposes of identification. Bands 60 are preferably red in color while bands 61 are preferably yellow. Other contrasting colors may be used, if desired. Receptacles R1 through R5 are provided with incandescent lamps, L1 through L5, respectively. The cover carries an electric buzzer 62 that includes a removable snap-on cover 63 and a pair of contact posts 64 and 65 (Fig. 5). Adjacent the buzzer is a pair of through openings 66 and 67 that are encircled by contrasting color bands 68 and 69 which are preferably the same as color bands 60 and 61, respectively.

The cover also carries other electrical units, namely a push button switch 70 and a gang switch 71, the latter consisting of three independent toggle switches 72, 73 and 74. The contact posts for toggle switch 72 are identified by numerals 75 and 76 in Fig. 5. The gang switch has a cover plate 77 that is maintained in position by screws 78. The cover plate has a plurality of apertures 79 through which the toggle switches project.

For the purpose of describing the operation and manner of using the illustrated embodiment of the invention, it is first assumed that the device is assembled as shown in Figs. 1 through 4 and that the device is connected to a convenient source of electric energy by coupling units 30 and 31 and cable 32. Both bus bars B1 and B2 are "live" but may safely be touched due to the low voltage of the electric energy supplied thereto. The circuit may be completed by connecting the electrical units carried by cover 16 in various arrangements to the bus bar. The following examples are illustrative of a few of such arrangements.

Example 1.—Lamp L2 may be readily placed in active service by means of conductor wires 80 and 81 represented by the dash-dot lines shown in Fig. 5. This is accomplished by connecting one end of wire 80 to a contact post 29 of bus bar B1, then inserting the other end of wire 80 through opening 58 of receptacle R2 and connecting it to contact post 56 of that receptacle. One end of conductor wire 81 is connected to a contact post 29 of bus bar B2 and its other end is passed upwardly through opening 59 adjacent receptacle R2 and then connected to contact post 57 of that receptacle.

Example 2.—The circuit may be completed by connecting one of the lamps, such as lamp L1, in series with one of the switches, such as switch 72, as indicated by the conductor wires represented by the dash-double-dot lines 82, 83 and 84 in Fig. 5.

Example 3.—A pair of lamps, such as lamps L3 and L4, may be connected in series with buzzer 62 and push button switch 70 by the conductor wires represented by the double-dash-dot lines 85, 86, 87, 88 and 89 in Fig. 5.

At such times as the circuits are properly completed, signal lamp 47 will be automatically energized and window 42 will be illuminated, thereby indicating that all is well. Signal lamp 48 and buzzer 50 are normally out of active service. In the event of a short circuit in using the device, signal lamp 47 will be automatically deenergized and signal lamp 48 and buzzer 50 will be instantly and simultaneously energized, thereby indicating visually and audibly the short circuit condition and putting the user on notice that steps should be taken to correct the condition causing the short.

From the foregoing, it is believed that the construction, operation, features and advantages of my present invention will be readily comprehended by persons skilled in the art. It is to be clearly understood, however, that the form of my invention herewith shown and described is to be taken as a preferred example of the same and that various changes in the shape, size and arrangement of parts may be resorted to without departing from the spirit of my invention as defined by the appended claims.

I claim:

1. In an electrical educational device, a casing, a partition dividing the interior of the casing into a first compartment and a second compartment, said casing including a hinged cover permitting access only to the second compartment, electric circuit means comprising transformer means within the first compartment and adapted to be connected to a suitable source of electric energy, said transformer means being adapted to reduce the voltage of the electric energy supplied thereto, a pair of electrically conductive members positioned in the second compartment and connected to the low voltage side of the transformer means, at least one electric unit mounted on the cover and adapted to be connected to the conductive members whereby to complete the circuit means, and electric signaling means comprising a first lamp that is adapted to be energized only when the circuit means has been connected properly and a second lamp that is adapted to be energized only when the circuit means has been connected improperly, said lamps being disposed in the first compartment and inaccessible from the exterior of the casing.

2. In an electrical educational device, a casing, a partition dividing the interior of the casing into a first compartment and a second compartment, said casing including a hinged cover permitting access only to the second compartment, electric circuit means comprising transformer means within the first compartment and adapted to be connected to a suitable source of electric energy, said transformer means being adapted to reduce the voltage of the electric energy supplied thereto, a pair of electrically conductive members positioned in the second compartment and connected to the low voltage side of the transformer means, at least one electric unit mounted on the cover and adapted to be connected to the conductive members whereby to complete the circuit means, and electric signaling means comprising an audible sound producing device that is adapted to be energized only when the circuit means has been connected improperly.

3. In an electrical educational device, a casing, a partition dividing the interior of the casing into a first compartment and a second compartment, said casing including a hinged cover permitting access only to the second compartment, electric circuit means comprising transformer means within the first compartment and adapted to be connected to a suitable source of electric energy, said transformer means being adapted to reduce the voltage of the electric energy supplied thereto, a pair of electrically conductive members positioned in the second compartment and connected to the low voltage side of the transformer means, at least one electric unit mounted on the cover and adapted to be connected to the conductive members whereby to complete the circuit means, and electric signaling means comprising a lamp that is adapted to be energized only when the circuit means has been connected properly and an audible sound producing device that is adapted to be energized only when the circuit means has been connected improperly.

4. In an electrical educational device, a casing, a partition dividing the interior of the casing into a first compartment and a second compartment, said casing including a hinged cover permitting access only to the second compartment, electrical circuit means comprising transformer means within the first compartment and adapted to be connected to a suitable source of electric energy, said transformer means being adapted to reduce the voltage of the electric energy supplied thereto, a pair of electrically conductive members positioned in the second compartment and connected to the low voltage side of the transformer means, at least one electric unit mounted on the cover and adapted to be connected to the conductive members whereby to complete the circuit means, and electric signaling means comprising a first lamp, a second lamp and an audible sound producing device, said first lamp being adapted to be energized only when the circuit means has been connected properly, said second lamp and sound producing device being adapted to be energized only when the circuit means has been connected improperly.

5. An electrical educational device in accordance with claim 4 wherein the sound producing device is also disposed in the first compartment and inaccessible from the exterior of the casing.

6. In an electrical educational device, a casing, a removable partition dividing the interior of the casing into a first compartment and a second compartment, said casing including a hinged top cover permitting access only to the second compartment, electric circuit means comprising transformer means within the first compartment and adapted to be connected to a suitable source of electric energy, said transformer means being adapted to reduce the voltage of the electric energy supplied thereto, a pair of electrically conductive members connected to the low voltage side of the transformer means, said conductive members being carried by the partition and disposed in the second compartment, at least one electric unit mounted on the cover and adapted to be connected to the conductive members whereby to complete the circuit means, electric signaling means for visually indicating whether the circuit means has been connected properly, said signaling means comprising a first lamp that is adapted to be energized only when the circuit means has been connected properly and a second lamp that is adapted to be energized only when the circuit means has been connected improperly, and audible sound producing means that is adapted to be energized only when the circuit means has been connected improperly, said lamps and sound producing means being positioned within the first compartment.

References Cited in the file of this patent

UNITED STATES PATENTS

| | | |
|---|---|---|
| 405,572 | Loomis | June 18, 1889 |
| 1,911,243 | Rosenthal | May 30, 1933 |
| 2,256,862 | Duffy | Sept. 23, 1941 |
| 2,592,552 | Florez et al. | Apr. 15, 1952 |
| 2,610,229 | Cranford | Sept. 9, 1952 |
| 2,611,008 | Wilcock et al. | Sept. 16, 1952 |